(12) United States Patent
Naillon

(10) Patent No.: US 6,442,438 B1
(45) Date of Patent: Aug. 27, 2002

(54) METHOD FOR CONTROLLING A DECISIONAL PROCESS WHEN PURSUING AN AIM IN A SPECIFIC FIELD OF APPLICATION, SUCH AS ECONOMICAL, TECHNICAL, ORGANIZATIONAL OR SIMILAR AND SYSTEM FOR IMPLEMENTING THE METHOD

(76) Inventor: Martine Naillon, 12 Avenue de Verdun, 92330 Sceaux (FR)

( * ) Notice: Subject to any disclaimer, the term of this patent is extended or adjusted under 35 U.S.C. 154(b) by 0 days.

(21) Appl. No.: 09/443,371

(22) Filed: Nov. 19, 1999

(30) Foreign Application Priority Data

Apr. 16, 1999 (EP) ............................................ 99400939

(51) Int. Cl.[7] ............................................. G05B 13/02
(52) U.S. Cl. ............................. 700/36; 700/28; 700/30; 700/31; 700/49; 700/103; 700/104; 709/201; 709/202; 709/203; 709/100; 707/100; 707/101; 707/200; 706/10; 706/14; 706/45; 706/914
(58) Field of Search ............................. 700/28, 24, 30, 700/31, 32, 36, 49, 103, 104; 707/3–5, 10, 100, 101, 200; 703/6; 706/10–11, 14–15, 45–50, 414; 709/201, 202, 203, 100

(56) References Cited

U.S. PATENT DOCUMENTS

| 5,241,671 A | * | 8/1993 | Reed et al. ..................... 707/3 |
| 5,265,065 A | * | 11/1993 | Turtle ............................. 707/4 |
| 5,408,619 A | * | 4/1995 | Oran ............................ 707/10 |
| 5,434,974 A | * | 7/1995 | Loucks et al. ............... 707/101 |
| 5,628,011 A | | 5/1997 | Ahamed et al. ............. 395/610 |

FOREIGN PATENT DOCUMENTS

| WO | WO9820258 | 6/1997 |
| WO | WO9847059 | 10/1998 |

OTHER PUBLICATIONS

Chaib–draa, "Connection Between Micro and Macro Aspects of Agent Modeling", Proceedings of First International Conference on Autonomous Age, Feb. 1997, pp. 262–267.

Chouvet et al., "Knowledge Bases And Agents For Domain Knowledge Representation", IEEE International Conference on Tools . . . , Nov. 1996, pp. 224–227.

* cited by examiner

Primary Examiner—Ramesh Patel
(74) Attorney, Agent, or Firm—Leydig Voit & Mayer, Ltd

(57) ABSTRACT

A method for controlling a decisional process when pursuing an overall aim in a specific field of application, such as economic, technical, organisational or similar, which is automated by the placing in relation, according to rules and strategies predetermined in accordance with the overall aim of at least one knowledge object reflecting a point of view of the field of application and comprising an item of information interpreted as an alarm sign for the decisional process with other knowledge objects reflecting other points of view or other fonctional competencies of the same field of application or of other fields.

24 Claims, 4 Drawing Sheets

METHOD FOR CONTROLLING A DECISIONAL PROCESS WHEN PURSUING AN AIM IN A SPECIFIC FIELD OF APPLICATION, SUCH AS ECONOMICAL, TECHNICAL, ORGANIZATIONAL OR SIMILAR AND SYSTEM FOR IMPLEMENTING THE METHOD

The present invention concerns a method for controlling a decisional process when pursuing an aim in a specific field of application, such as economic, technical, organisational or similar and a system for implementing the method.

At the current moment, in the field of managing knowledge, the collecting of data relating to knowledge derived from internal or external sources, such as Intranet or Internet and their exchanges between various services organised to analyse them and take decisions concerning a pursued predetermined aim, systematically require the intervention of persons of users of the services in question.

The drawback of this known procedure for processing data consists of being scarcely flexible to use as it requires the presence and intervention of users to analyse and exchange knowledge data and to take decisions, and avoids systematically using all the available collective and/or personal knowledge.

The object of the present invention is to eliminate the above-mentioned drawbacks of known systems by proposing a method for controlling a decisional process when pursuing an overall aim in a specific field of application, such as economic, technical, organisational or similar, and which is charactersed in that according to rules and strategies predetermined in accordance with the overall aim, it is automated by the placing in relation of at least one knowledge object reflecting a point of view of the field of application and comprising an item of information interpreted as an alarm sign for the decisional process with other knowledge objects reflecting other points of view or other functional competencies of the same field of application or of different fields, implementing the course of the decisional process.

According to one characteristic of the invention, a network of data processing agents is created comprising agents creating knowledge objects and agents for constructing knowledge objects by adding to the created knowledge objects additional knowledge objects obtained by being placed in relation with other knowledge objects.

According to another characteristic, the network is set up in the form of a hierarchised structure dependent on said overall aim, each agent comprising a base of rules, a base of strategies and a base of individual aims, the creator agents constituting, the end nodes of the network.

Again, according to another characteristic, the agents are organised into loops, each comprising a master agent and at least one son agent, a son agent being able to be a master agent of a loop of a lower level of the network, the base of the network being formed by analysis loops of knowledge objects comprising a knowledge objects analyser master agent and knowledge objects creator agents, the knowledge objects being constructed when they move inside the structure of the network towards the top of the latter.

According to another characteristic, the structure of the network is obtained by a successive decomposition of the decision process on the basis of the overall aim into individual aims and strategies, the strategy of an agent level n becoming the aim of the agents of the lower level n-1.

According to still another characteristic, the decisional process is broken down into decisional generic steps, so-called cognitive invariants, which are propagated in the form of aims and strategies from level to level in the structure.

According to another characteristic, the network is constructed according to a fractal configuration.

According to another characteristic, for a given application, the structure of the loops of agents is determined by referring to an agent for structuring services of the loop and a knowledge structuring agent for each service created.

The system for implementing the method is characterised in that it is formed by a network of agents having the shape of a pyramid whose top constituting the level n is formed by a master agent associated with a certain number of son agents forming the level n-1, each son agent being able to be a master agent of a certain number of son agents constituting a lower level, the base of the pyramid being formed by analyser agents, each being provided with a certain number of cognitive agents creating knowledge objects.

The invention shall be more readily understood and other aims, characteristics, details and advantages of the latter shall appear more clearly from a reading of the following illustrative description with reference to the accompanying diagrammatic drawings given solely by way of example illustrating an embodiment of the invention and in which.

Figure 4:
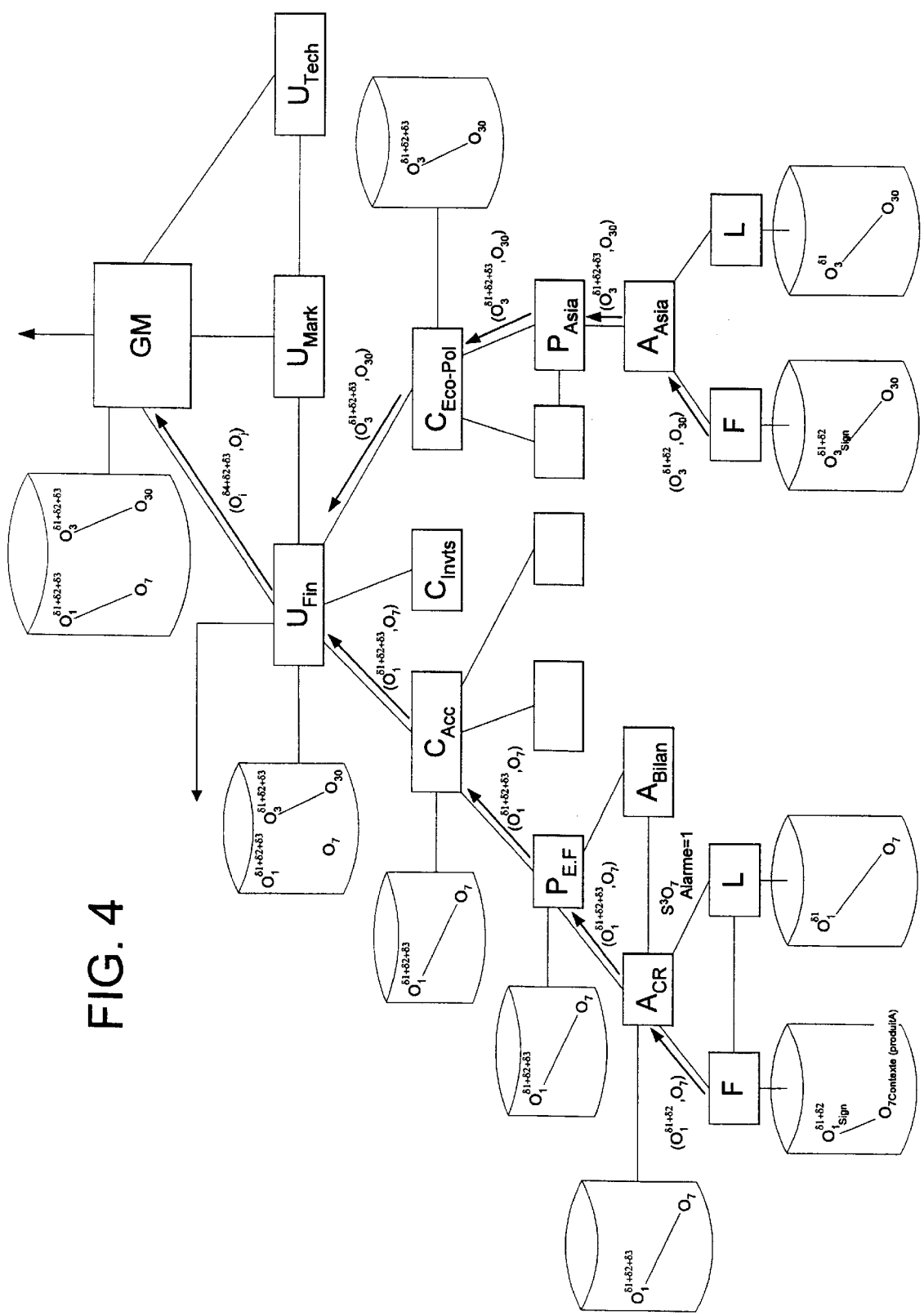
Figure 6:
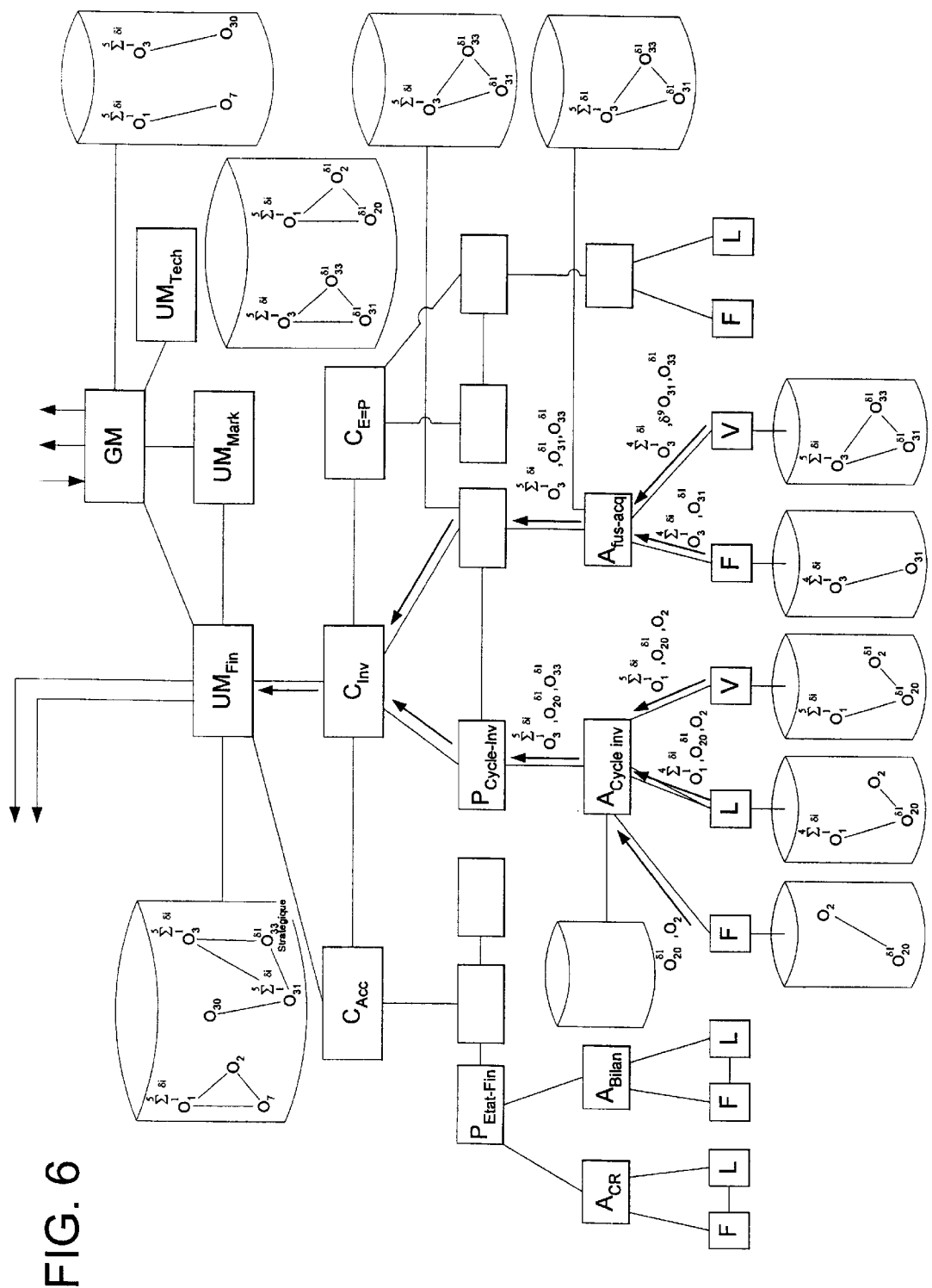

FIGS. 4 and 6 diagrammatically illustrate the creation and construction of knowledge objects within the context of the cognitive invariant 1 and the cognitive invariant 2.

Figure 1:
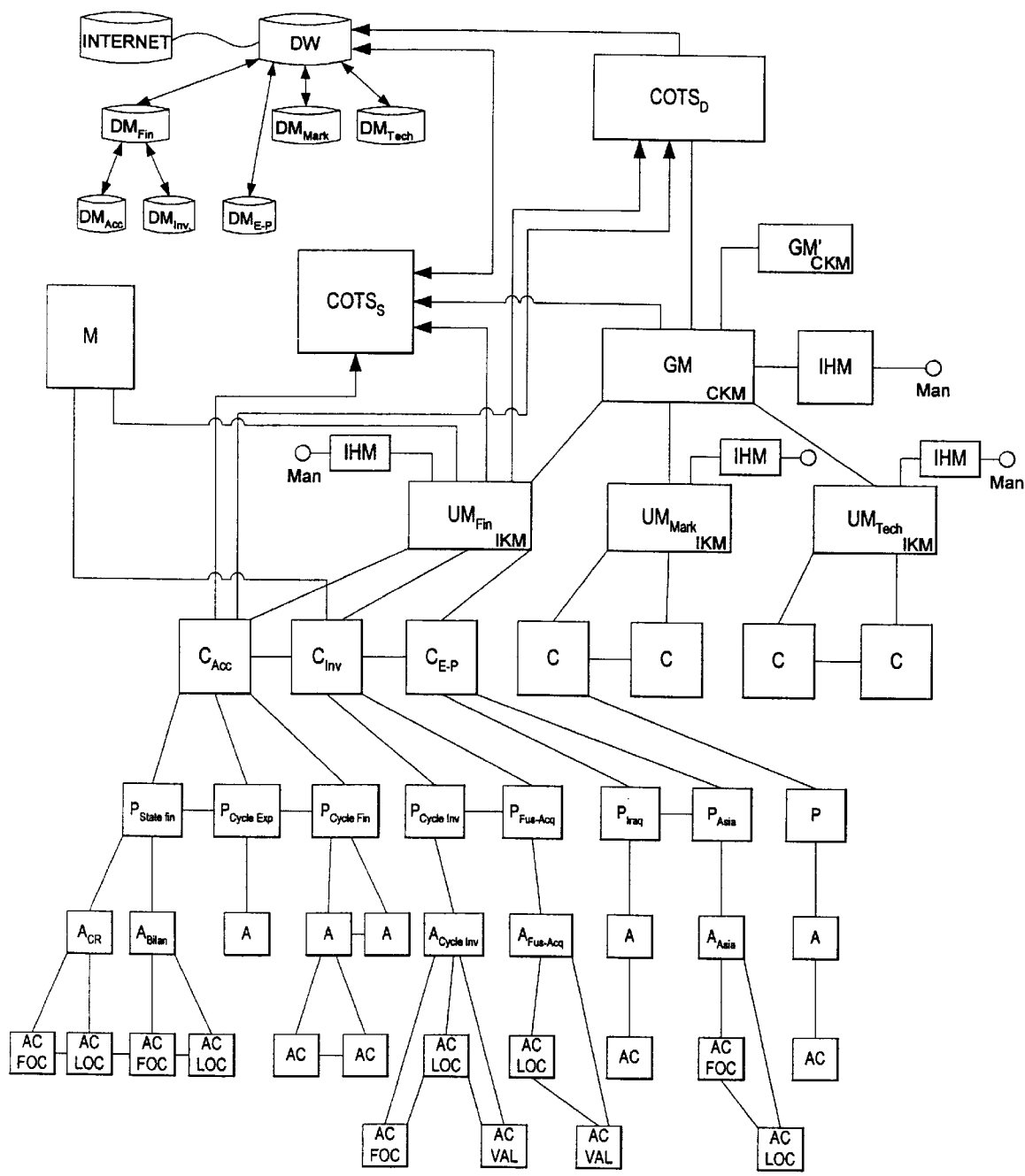
FIG. 1 represents the hierarchised structure of a network of agents for creating knowledge objects and agents for constructing knowledge objects for implementing the method for controlling the decisional process of the invention.

FIG. 1 shows the principle of the structure of a system for controlling a decisional process when pursuing an aim in the specific field of application, such as economic, technical, organisational or similar.

The system appears in the form of a network of a multitude of data processing agents in a hierarchised structure in the form of a pyramid and organised into loops, each comprising a master agent and at least one son agent, the latter constituting the master agent of a loop of a lower level.

More specifically, the pyramid on FIG. 1 comprises at the top forming the level n a master agent of group GM associated in the example shown with three son agents known as master users UM which form the lower level n-1. Each agent UM controls a certain number of channel agents C forming the level n-2. Associated with each agent C is at least one track agent P forming the level n-3. Each agent P has at least one analysis agent A of the level n-4. Associated with each analysis agent A is one or several agents known as cognitive agents AC used to capture or detect the data contained in the scene they observe representative of the application in question.

FIG. 1 shows a fully structured system. It is to be noted that an overall aim might not need all the agents available. The example shown later only needs a more limited network. On FIG. 1, the agents actually used are indicated by sign terms. However, as explained subsequently, one of the main special features of the invention resides in the fact that the system gradually structure itself as the decisional process moves forward in the form of a sequence of operations occurring in accordance with the rules of the aim, strategy and action plan which are predetermined and adaptable by the user, but selected for accomplishing an operation according to the results of the preceding operations. To this end, when structuring the loops, in order to carry out its function in the decisional process as part of the pursuit of the overall aim, each agent is provided with aim, strategy and action plan rules.

The decisional process is generally is broken down into decisional stages known as cognitive invariants. In each decisional stage, the overall aim is broken down into strategies and individual aims which propagate from top to bottom inside the network.

More specifically, the structuring of the agents is made from one level of the pyramid to the lower level by successively breaking down the overall aim, for each decisional step, into strategies and individual aims, the strategy of a level of given agents becoming the aim of the agents of the lower level. The pyramid-shaped network then has the fractal configuration shown to the extent that each loop shall be structurally reproduced from level to level.

So that the network is able to be constructed in this way according to an overall aim, the system of the invention comprises services and data structuring agents respectively called $COTS_S$ and $COTS_D$. The services structuring agent $COTS_S$ is designed to be able to determine the services, which are required for the contribution to the carrying out of the overall aim and individual aims, which are available to a master agent of a level i, that will form the agents at a level i-1, and according to predetermined rules. According to the services required to implement an aim and the available services, the structuring agent shall organise the services of the loops. The data structuring agent shall send to each service the data required for carrying out the granted function. The data is stored in a data store DH in the form of packets of multimedia structured data, i.e. digital, textual, image, sound, . . . data, which are structured according to the services of the services structuring agent. The store is a reservoir of multimedia knowledges, that are capitalized for example on private servers of the Intranet or Extranet type, which are permanently connected to the Internet communication network, so that it is able to acquire the data it does not have and thus continually update the information to be used to fulfil the aim.

The system of the invention further comprises a data and services memory device M able to memorise the structure of a network which has been previously constructed for pursuing an overall aim. By means of this memory, the invention is able to quickly reconstruct a previously established network for the same overall aim. During carrying out an overall aim, the memory M stores all the structured data corresponding to each agent.

It is to be further noted that the invention, especially at the level of a group master agent GM and user agents UM, is able to interact with the outside world by means of a man-machine interface IHM. In particular, a man may at any time, in case and by a substitution to the COTS, enter new services, i.e. new rules, and new data. These interventions of the man and the modifications resultant from the course of the decisional process shall be taken into consideration by the structuring agents and be memorised.

The represented network of agents in the form of a pyramid of agents is made up of two vertical portions whose parting line passes between the track agents P and the analysis agents A. The analysis loops comprising the analysis agents and their associated cognitive agents are used to create knowledge objects, whereas the agents of higher levels enrich the knowledge objects, as shall be described subsequently. These agents are called constructor agents. The number of levels of constructor agents depends on the overall aim to be completed.

The network of agents is also composed of N horizontal portions, according to the parting lines that separate the agents UM therebetween. Each agent UM and its associated service agents shall correspond to a user and to a so-called IKM individual machine. The agent GM federates, for example via Internet or Intranet, a plurality of IKM machines, for constituting a so-called CKM individual machine, designed for a collection of users in a network.

So as to more clearly show the special features of the invention, there now follows by way of non-restrictive example a description of the process for structuring knowledge objects constructor and creator agents for which is it necessary to have available a concern to provide a budgetary follow up, the synthesis of the individual decisions being effected by each master agent UM in FIG. 1, that is also the individual knowledge manager of each machine IKM, and the synthesis of the collective decisions being made by a master agent GM in FIG. 1, that is also the collective knowledge manager CKM. The knowledge managers UM and GM interact with the outside world by means of a man-machine interface IHM, an individual machine forming the master user manager agent UM in FIG. 1, and its associated agents, and a collective machine forming the master group agent GM and its associated machines IKM. The budgetary follow up constituting said overall aim comprises several decisional stages, called invariants, namely hereafter the automatic detection of alarm signs and the validation of these signs.

When formulating the overall aim, a man indicates to the collective knowledge manager CKM by means of its interface IHM, the ways and means which need to be taken into consideration, such as in the present example the "rapid and low cost" condition, called hereafter cond. 1, the state of the machine, the indications concerning the source structure from which the data shall be extracted, and the collective manager profile. Each individual user shall indicate, to the individual knowledge manager IKM, its profile by means of its individual interface IHM. The state of the system could be the initial state or the state that is obtained after an operating reconfiguration following an intervention on a manager CKM or IKM.

The strategy and aim rules according to which the network is established are given in appendix I, but the description which follows shall explain details of their applications in the selected aim of the budgetary follow up.

The generic aim rule of the agent GM determines for the formulated overall aim with matched ways and means the generic strategy 1 broken down into strategies 1.0, 1.1 and 1.2. The purpose of the strategy 1.0 is to structure services, the strategy 1.1 to structure data and the strategy 1.2 is to detect signs (invariant 1).

It is to be noted that the aim and strategy rules still comprise the indication of the invariant and of the ways and means so that the agent to which the message is addressed can correctly carry out its function, as shown in appendix I. For reasons of simplicity, the indications shall no longer be mentioned hereafter, except when this seems necessary.

Pursuant to the strategy rule 1.0, the agent GM sends to the services structuring agent COTs a message "aim 1=strat 1.0 (overall aim, GM)=GM services structuring to carry out the overall aim". In response to the message, this agent looks in its memory or interrogate an outer server, for the services which are necessary and available for the overall aim.

In the selected aim example (budgetary follow up), three services are available, namely the FINANCIAL, MARKETING and TECHNICAL services. The services structuring agent sends them to the agent GM which shall then create the financial, marketing and technical master users called $UM_{fin}$, $UM_{mark}$, $UM_{tech}$ terminate the strategy 1.0 and then implement strategy 1.1. According to this rule defined by:

if strat=strat 1.1 if service=service 1 ($service_{fin}$;

$service_{mark}$; $service_{tech}$), and if structure=DH
the agent GM shall send the aim message "aim 1=strat 1.1 (overall aim; service 1)" to the data structuring agent $COTS_D$ which in response transmits the data in the form of structured knowledge packets corresponding to the services, namely the packets of structured data $DM_{fin}$, $DM_{mark}$, $DM_{tech}$ extracted from the store for storing structured knowledge DH. In the present example, the knowledges are structurated in the form of a design tree. Other structuring modes can be used. After receiving the structured data packets, the agent GM terminates the strategy 1.1 and implements the strategy 1.2.

According to the rule of this stage of the process defined by if strat=strat 1.2 if structure=$DM_{fin}$, $DM_{mark}$, $DM_{tech}$
the agent GM sends the user agent $UM_{fin}$ the aim message "aim=strat 1.2=signs detection".

The agent $UM_{fin}$ has aim and strategy rules it uses to carry out its function within the context defined by the overall aim. Pursuant to its aim rule:

if aim=signs detection and if structure=$DM_{fin}$,
the agent structures the loop it masters.

This structuring occurs again according to the strategy rules 1.0, 1.1 and 1.2 in three successive stages, as described earlier for structuring of the loop of the agent GM.

According to the strategy rule 1.0, the agent $UM_{fin}$ sends the aim message 1=strat 1.0 to the services structuring agent of the individual knowledge manager IKM which constitutes the agent UM. The structuring agent shall establish that, for the overall aim with matched ways and means, the agent $UM_{fin}$ is able to have services $C_{acc}$, and $C_{inv}$ and $C_{e-p}$ that is accounting, investment and economic-political services. It is to be noted that at this level of structuring, the economic-political service is added to the two financial services, this service being situated outside the purely financial field and thus bringing a different point of view.

Obviously, the addition of this new service could also be made by means of a man acting on the agent $UM_{fin}$ via the interface IHM. This configuring of the loop with the service $C_{e-p}$ shall be stored in the memory M and in the $COTS_S$, which forms an enrichment of the $COTS_S$ by the intervention of a man and illustrates the flexibility and adaptability of the system.

After the creation of the above-mentioned services in the loop controlled by the agent $UM_{fin}$ and after the end of the strategy 1.0, and pursuant to the strategy rule:

if strat=strat 1.1 (overall aim) and if service=$C_{acc}$, $C_{inv}$ and $C_{e-p}$=service 1, and if structure=$DM_{fin}$ ⇒send aim 1=strat 1.1 (overall aim, service 1) to $COTS_D$.
the $COTS_D$ data structuring agent shall send the agent $UM_{fin}$ the packets of digital, textual and image data or the like corresponding to the above-mentioned services, namely the $DM_{acc}$, $DM_{inv}$ and $DM_{e-p}$ the $DM_{acc}$ and $DM_{inv}$ being extracted from the $DM_{fin}$ and the $DM_{e-p}$ being extracted from the data store DH. Then the agent $UM_{fin}$ terminates the strategy 1.1 and now implements the strategy 1.2 according to the strategy rule if strat=strat 1.2 if structure $DM_{acc}$, $DM_{inv}$, $DM_{e-p}$

⇒sends aim=strat 1.2=signs detection by channel to the channel agent $C_{acc}$ and the channel agent $C_{e-p}$.

After structuring of the loop controlled by the agent $UM_{fin}$ and comprising the channel agents $C_{acc}$, $C_{inv}$ and $C_{e-p}$ of which only the agents $C_{acc}$ and $C_{e-p}$ shall be used for the invariant 1, it is proper to structure the loop of each of the two agents $C_{acc}$ and $C_{e-p}$.

This structuring is made according to the strategy and aim rules matched with each of the two agents. The aim of each agent is the strategy 1.2 of the agent $UM_{fin}$ that is the signs detection per channel. The strategy rules are the-three strategy rules 1.0, 1.1 and 1.2. As previously, the strategies 1.0 and 1.1 structures the services and allocates an appropriate data packet to each service.

Thus, the channel agent $C_{acc}$ creates the track agents intended for the financial states, the exploitation or operating cycles and the financing cycles called hereafter $P_{state\ fin}$, $P_{cycl\ exp}$ and $P_{cycle\ fin}$ with the appropriate data packets $DM_{state\ fin}$, $DM_{cycle\ exp}$ and $DM_{cycyle\ fin}$ which have been extracted by the agents $COTS_D$ from the packet $DM_{acc}$. The strategy rule 1.2 causes the agent $C_{acc}$ to send the strategy message strat 1.2=sign detection per track to the agent $P_{state\ fin}$ as the aim to be implemented.

Pursuant to the strategy rules 1.0 and 1.1, the channel agent $C_{e-p}$ creates the track agents intended for Iraq and Asia and called $P_{Iraq}$ and $P_{Asia}$. The rule 1.2 causes the agent $C_{e-p}$ to send the strategy message strat 1.2=sign detection per track to the agent $P_{Asia}$ as the aim to be implemented.

The next stage is structuring of the loop of each track agent according to the strategy and aim rules. The aim rule being if aim=local aim 1=signs detection per track with the matched ways and means, it is appropriate to apply the strategy rule strat=strat 1.0 which informs the track agent to select the number of analysis agents A and, according to the strategy 1.1, the latter sends the analysis agents the aim to be achieved, namely the aim message aim=strat 1.1=search for alarm signs.

By proceeding in this way, the track agent $P_{state\ fin}$ creates result account analysis agents $A_{ra}$ and balance sheet $A_{balance\ sheet}$ and the knowledge $DM_{RA}$+$DM_{balance\ sheet}$. The track $agent_{Asia}$ creates a single analyser agent, namely the agent $A_{Asia}$ with $DM_{Asia}$.

Each analyser agent works according to the aim and action plan rules. Generally speaking, these rules are as follows:

Aim rule if aim=local aim 1=search for alarm signs

⇒apply plan=plan 1.

Plan rule if plan=plan 1

⇒create N cognitive agents (according to condition 1)

⇒apply plan 1 to the cognitive agents.

In the present budgetary follow up example as the overall aim, only the agent $A_{RA}$ is used and this analyser agent creates two cognitive agents, namely a focussing agent FOC which is a detector of small signals in the scene established by $DM_{RA}$ and a localisation agent LOC for detecting design branches. Pursuant to plan 1, the analyser agent sends the agent FOC the request to search for small signals in the appropriate scene. After detecting a small signal to be retained, considered as a knowledge object $O_i$, the agent FOC sends a request to the agent LOC for the latter to establish the context in which the object $O_i$ is situated, this context then constituting another knowledge object $O_j$. After the return of the request to the agent FOC with the result, this agent sends the object $O_i$ enriched by the placing in context according to $O_j$ back to the analyser agent.

The knowledge objects have the predetermined structure shown hereafter and comprising a certain number of fields. Each field has a knowledge object aspect. The terms appearing in brackets are several examples shown to illustrate the nature of the field in question.

→ID (identity)
→Type (Ex: sign, support point, mark point, recognised object . . . )
→Context (Ex: subject of paragraph, geographical environment of an object in an image . . . )
→Forms (per form creator) (Ex: Paragraph, LOC creator; Word, FOC creator . . . ) (type; elementary or composite) (Ex: tree, branch, doc, images elements, numerical value)
→Property (Ex: Risk zone, strategic zone, under surveillance zone, numerical value deviation . . . )
→Use (Ex: Contents name, name of a technician, competitor, partnership . . . )
→Links (per link creator) (with a type)
→Media (Image, text, sound)
→Alarm
→Source
_Creator (FOC, LOC, . . .

The links between knowledge objects are of various types:
→Contained in
→Derived from
→Physically close (in a text or image)
→Semantically close (synonym, identical expression . . . )
→Logically associated
→High, low attraction, . . .

More specifically, the generation of knowledge objects by a cognitive agent is made pursuant to expertise rules. The rules of the object FOC are the following:

if aim=search for small signals, and
if structure=$DM_{CR}$, formed for example by digital values issued from an integrated managing software package of accountancy
⇒use know-how 1=calculate signals of the "instrument panel"
⇒use know-how 2=alarm signal detection in digital source values
⇒if signals amplitude greater than the threshold to create $O_1$ so that
→Id
→Type (sign)
→Creator (FOC)
→Form (skeleton type, FOC creator, structure $DM_{RA}$ form=numerical value ΔX, media=source numerical values)
→Property (Instrument panel deviation)
⇒send the message for establishing the $O_1$ context to the agent LOC in $DM_{RA}$.

The calculation of the instrument panel signals consists of establishing the values of the current parameters of the economic activity of the company in the data structure $DM_{RA}$ and of comparing them with the logging parameters which need to be observed. The results ΔX of this comparison form the above-mentioned signals. If from amongst the signals established certain signal values exceed a predetermined threshold, the cognitive agent FOC creates the knowledge object $O_1$ representative of the alarm sign.

Figure 2:
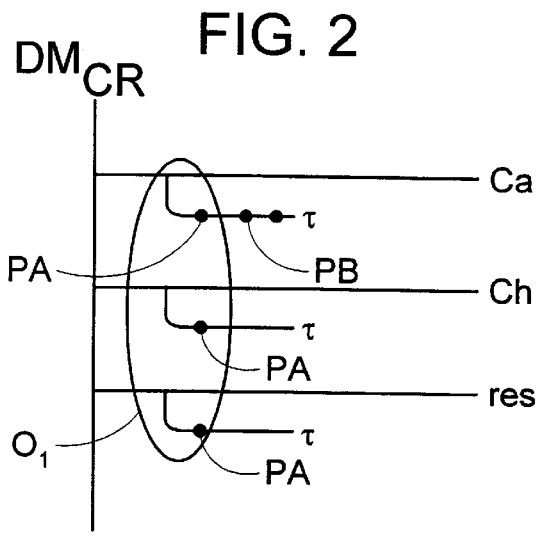
FIGS. 2, 3 and 5 illustrate three examples for structuring knowledge in the form of a design tree.

There now follows a description of how the cognitive agent FOC functions by referring to FIG. 2 which shows the structure of knowledge contained in the knowledge packet $DM_{RA}$. The structure of this data is represented in the form of images, the first one representing the result accounts in the form of a design tree. The structure in the form of a design tree is known. FIG. 2 explains certain terms used for the knowledge objects. The tree represented comprises a certain number of branches, three being shown and representing the turnover ca, the charges ch and the results res. Attached to each branch is a certain number of sub-branches, only one being shown. This denoted by P concerns the products commercialised by the company proceeding with the budgetary follow up. These products are represented on the sub-branches by the points PA, PB . . . It is to be noted that on the image represented, each product can be identified by the coordinates of the point it represents on the image.

By applying the first and second know-how rules, the agent FOC establishes in the sources data of the structure of knowledge $DM_{RA}$ the significant alarm signals situated above the reference threshold. The points, which in the design tree $DM_{RA}$ are representative of the retained alarm signals, shall be differentiated from the environment, for example illuminated, by the cognitive agent FOC. On FIG. 2, a point is lit up on the sub-branch p of the branches ca, ch and res. It is these retained signals which give rise to the creation by the agent FOC of the knowledge object $O_1$. This object is of the sign type, has been created by the agent FOC and has a "skeleton" shape, that is it is formed by rare points which so far have not been connected. Its property is that the signs are numerical values in the source data. In the structure of the knowledge object $O_1$, the fields type, creator, shape and property are already defined when creating the object.

Then in accordance with the rules of the agent FOC, when an object $O_1$ has been created, the agent sends a message requesting that the context of the object $O_1$ be established to the cognitive agent LOC. So as to carry out this request, the agent LOC applies the know-how rules and the following generic context creation rules:

If aim=establishing context, if structure=$DM_{CR}$
⇒use know-how 1=Concept branch contour detection per common property (which detects one branch which contains $O_1$)
⇒If a common property exists at the points defining the form of $O_1$, define a branch as being the context of the object $O_1$ and create $O_7$
→Id
→Type (recognised object)
→Creator (LOC $A_{CR}$)
→Form (type=zone, creator LOC, Structure=$DM_{CR}$, form=design branch, media=design tree
→Use (product A)
→Connected to $O_1$ (creator LOC, type=contained in)
⇒Update $O_1$ so that $\delta^1 O_1$
→Context (product A)
→Connected to $O_7$ (creator LOC, type=context of)
→cat=1 (a sign object of a category 1 is contained in its context
⇒return to FOC ($O_7$, $\delta^1 O_1$)

Pursuant to these rules, the function of the agent LOC consists of searching to see if the differentiated points on FIG. 2 have at least one common characteristic. By referring to the data subjacent to the image of the tree, the agent LOC checks that the three illuminated or differentiated points on FIG. 2a are representative of the product PA. This product thus is revealed as constituting the context in which the object $O_1$ is situated. Accordingly, the agent LOC creates the object $O_7$ specified above and updates the object $O_1$ by creating $\delta^1 O_1$. Then the agent LOC sends the objects $O_7$ and $\delta^1 O_1$ back to the agent FOC.

The agent FOC then applies the rule for creating the following small signals:

if aim=search for small signals (plan 1), if return of request for establishing context $(O_1)=(\delta^1 O_1, O_7)$, ⇒Make following inference: If form $(O_1)$ numerical value ΔX> threshold 1, if context $O_1$=Product PA, then update $O_1$ so that $\delta^2 O_1$, →interest=1

⇒return to agent $A_{RA}$ $(O_1^{\delta1+\delta2} O_7)$ and terminate plan 1.

In other words, the agent FOC, after receiving the response to its drawing up context request, updates the object $O_1$ according to the conditions specified earlier by adding to the object $O_1^{\delta1}$, that is updating by the agent LOC, the element $\delta^2$ which indicates that the object $O_1$ has an interest=1. In the structure of the object $O_1$ appears the interest field=1. After this updating of the object $O_1$ by adding the elements $\delta^1$ and $\delta^2$, this field is sent back to the analyser agent $A_{RA}$ in its enriched version $O_1^{\delta1+\delta2}$, accompanied by the objects which have been created at this particular time, that is $O_7$.

The relocation with, if applicable, the updating of the knowledge objects to the agent GM at the top of the pyramid is effected according to the return and updating rules which are appropriate to the various agents located on the circumferences of the objects. These rules are clearly dependent on the invariant which is implemented in the overall aim and the matched ways and means.

These rules in the budgetary follow up example are summed up as follows:

Rule of the analyser agent: A

If aim=search for signs, if fin plan 1 $(O_1^{\delta1+\delta2} O_7)$ if interest $(O_1^{\delta1+\delta2})$=1 if type $(O_1^{\delta1+\delta2})$=sign ⇒carry out $\delta^3$ $O_1^{\delta1+\delta2}$ →alarm=1

⇒carry out $O_1^{\delta1+\delta2+\delta3}$

⇒return to father of $(O_1^{\delta1+\delta2+\delta3}, O_7)$

Rule of agents P, C

If aim=signs detection per track (or per channel) and if return of aim=$(O_1^{\delta1+\delta2\delta3}, O_7)$ ⇒copy $(O_1^{\delta1+\delta2+\delta3}, O_7)$ ⇒return to father of $(O_1^{\delta1+\delta2+\delta3}, O_7)$ Rule of the agent UM If aim=sign detection, if aim return=$(O_1^{\delta1+\delta2+\delta3}, O_7)$ ⇒display $(O_1^{\delta1+\delta2+\delta3}, O_7)$ at the IHM of the IKM in structure located in the Form field Rule of the agent GM If aim=overall aim, if return of strat 1.2=$(O_1^{\delta1+\delta2+\delta3}, O_7)$ ⇒make copy $(O_1^{\delta1+\delta2+\delta3}, O_7)$ ⇒display $(O_1^{\delta1+\delta2\delta3}, O_7)$ at the IHM of CKM.

In accordance with these rules, the analyser agent $A_{RA}$ associates with the object $O_1^{\delta1+\delta2}$, which has been recognised that it has an interest and is of the sign type, the element $\delta^3$, which indicates that the object $O_1$ needs to be considered as indicating an alarm. The analyser agent updates the object $O_1$ by establishing $O_1^{\delta1+\delta2+\delta3}$. The analyser agent has also received the knowledge object $O_7$ and sends the updated objects $O_1^{\delta1+\delta2+\delta3}$ and $O_7$ to the track agent $P_{state-fin}$.

Then these two objects $O_1^{\delta1+\delta2+\delta3}$ and $O_7$ go back to the agent GM without being modified by passing through the track agents p, then channel C and user $UM_{fin}$. In the master user agent $UM_{fin}$, the knowledge objects are displayed at the Man-Machine interface IHM of the individual knowledge manager IKM. In the master group agent GM, the objects are also displayed at the Man-Machine interface IHM of the collective knowledge manager CKM.

After having described the creation and construction of the knowledge objects $O_1$ and $O_7$ by the agents FOC and LOC of the analyser agent $A_{RA}$ and their returning to the agent GM, there now follows a description of the work to be carried out by the focussing FOC and localisation LOC agents of the analyser agent $A_{Asia}$ pursuant to the plan and strategy rules generally mentioned earlier. The agent FOC si an agent for detecting the density in a design tree and it acts according to the following rules:

If aim=search for small signals, if structure=$DM_{Asia}$, for example formed of textual data issued from a software package for an electronic managing of documents, known per se ⇒use know-how 1=[structuring per country and create $DM_{Asia}$ (country)]

⇒use know-how 2=detection of alarm signals in the primary tree

⇒if signal surface>threshold 1, create $O_3$ so that:

→ID

→(Sign type)

→Form (type=zone, creator FOC, structure=$DM_{Asia}$ (Japan), sign=Company passing through a crisis in Japan, form=design branch, media=design tree)

→Property (design tree density)

⇒request establishing of context on $O_3$ at LOC in $DM_{Asia}$)

Rule for creating small signals

If aim=search for small signals (plan 1), if return for request of establishing context on $O_3=(\delta^1 O_3, O_{30})$ ⇒Make following interface: if $O_{30}$ linked to $O_3^\delta$ with link type=context connected from, if context $(O_3^{\delta1})$=company with shares going down, if type of form $(O_1^{\delta1})$=zone, then update $O_3$ so that $\delta^2 O_3^{\delta1}$ →interest=1

→cat=2 (a sign object of a category 2 has its context at the periphery thereof and the pertinent information is more in the context than in the sign)

→return to $A_{Asia}$ from $(O_3^{\delta1+\delta2}, O_{30})$ and terminate plan 1

The agent LOC acts according to the following rules:

If aim=requesting establishing context on $O_3$, if structure=$DM_{Asia}$

⇒use know-how 1=context branch detection

⇒if branch density>threshold 1, if branch density connected to $O_3$, then create $O_{30}$ (context) so that:

→Id

→Type (recognised object)

→Creator LOC $(A_{Asia})$

→Form (type=task, creator LOC, structure $DM_{Asia}$, index, form=design branch, media=design tree)

→Use=(company with falling shares)

→Connected to $(O_3$: creator LOC, type=context connected from)

⇒update $O_3$ so that
   $\delta^1 O_3$
   →Context=(company with falling shares)
   →Connected to ($O_3$: creator LOC, type=related context with
⇒return to FOC from ($O_{30}$, $\delta^1 O_3$).

Figure 3:
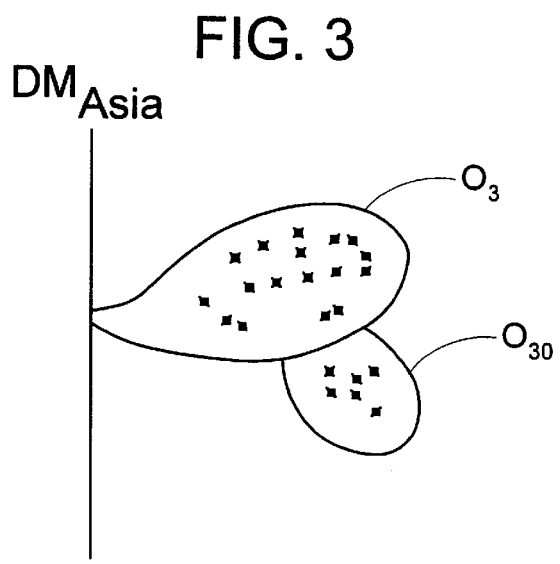
Figure 5:
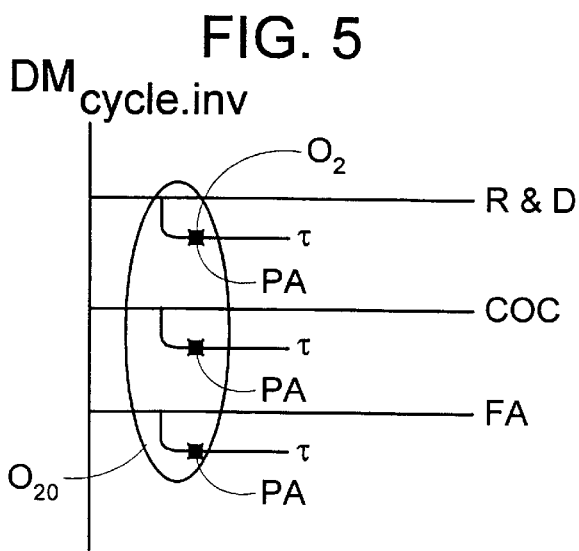

The know-how rule 1 of the agent FOC in the aim for searching small signals consists of carrying out a structuring per country of data $DM_{Asia}$. The data contained in this data packet is structured in the form of a design tree known in this field. FIG. 3 shows a zone devoted to companies in Japan. This zone is formed by points, each representing one company of this country without particular characteristics. It is therefore necessary to consider what can be of interest around this object. This defines the objects of the category 2. Pursuant to the know-how rule 2, this zone is detected by the agent which gives rise to the creation of the knowledge object $O_3$ with the fields indicated above.

Still pursuant to these rules, the agent FOC sends a request for establishing the context of the object $O_3$ to the agent LOC in the data structure $DM_{Asia}$. It is to be noted that the term in the property field "design tree density" means that a badly defined zone is observed but identified with a particular density of the tree.

In response to the request, the agent LOC is addressed in the design tree to the task of a small surface but a high density represented at the periphery of the zone forming the knowledge object $O_3$ which represents companies with falling shares. If this zone has a density exceeding a threshold value, the agent creates the knowledge object $O_{30}$, which has the structure indicated earlier, which is of the recognised object type and has inscribed in its use field "company with falling shares". The object $O_{30}$ is connected to the object $O_3$.

After updating of the object $O_3$ so that it appears in the form $O_3^{\delta 1+\delta 2}$, this object and the object $O_{30}$ are sent by the agent FOC to the analyser agent $A_{Asia}$. The latter adds to the object $O_3^{\delta 1+\delta 2}$ the element $\delta^3$ indicating that the object $O_3$ constitutes an alarm cause.

Then the knowledge objects $O_1^{\delta 1+\delta 2+\delta 3}$ and $O_{30}$ are sent to the agent GM at the top of the pyramid according to the transmission rules referred to earlier when returning the objects $O_1^{\delta 1+\delta 2\delta 3}$ and $O_7$.

With the return to the agent GM of the objects $O_1^{\delta 1+\delta 2+\delta 3}$, $O_7$, $O_3^{\delta 1+\delta 2+\delta 3}$ and $O_{30}$ completes the implementation of the invariant 1 of the sign detection in the "speed and low cost" conditions, within the overall aim of the budgetary follow up.

FIG. 3 illustrates the creation and relocation of the knowledge objects when implementing the invariant 1 and their display at the Man-Machine interfaces IHM of the collective CKM and individual IKM knowledge managers, the individual one being associated with the agent $UM_{fin}$. The figure shows the knowledge objects stored in the storage devices DST of the various agents with the links between the objects. The arrows symbolise the relocations of the knowledge objects which are associated with the arrows.

The system of the invention then implements the invariant 2 residing in the validation of the knowledge objects which have been created and constructed during the carrying out of the invariant 1.

The example illustrates a working in a mode in which the invariants following the invariant 1 shall be made in the same IKM, i.e. that of the financial user.

The implementation of the invariant 2 is carried out according to the predetermined aim, strategy and plan rules adaptable by the user and defined according to the way in which the invariant 1 has been implemented and knowledge objects resulting from the invariant 1. The generic aim, strategy and structuring rules within the context of the invariant 2 of the agents GM, UM, C and P are given in appendix II.

The invariant 2 is effected in an asynchroneous way relative to the invariant 1. It can be triggered upon arrival of a first alarm index to the agent GM and can be executed in parallel with execution of the invariant 1.

Thus, as it can be seen in appendix 11, the aim rule of the master group agent GM in the budgetary follow up may require when implementing the invariant 2 the joint application of strategy 1.2 for detecting signs and strategy 2 for validation. The strategy 2 rule for validation requires the agent GM:
   if strat=strat 2 ($O_1$, overall aim, condition 1, profile, state DH)
   if service associated with agent=$UM_{fin}$, $UM_{mark}$, $UM_{tech}$=service 1
for transmitting the strategy message=validation to the agent $UM_{fin}$ if the structured data are clearly the one which has been associated with the above-mentioned services when implementing the invariant 1, namely the data $DM_{fin}$, $DM_{mark}$ and $DM_{tech}$.

The agent $UM_{fin}$, according to its aim rule and pursuant to its strategy rule, sends a message of aim 1=strat 2.2= validation per channel to the agent $C_{inv}$ which has been established when implementing the invariant 1. But, since at the time of repositioning the invariant 1, the loop of the agent channel $C_{inv}$ has not been formed and this agent needs to establish it now.

In fact, according to its aim rule "if aim=local aim 1 according to the conditions of the established knowledge objects and with the constraint "speed, low cost", the agent $C_{inv}$ needs to apply the strategy rule strat=strat 2. The carrying out of this strategy involves the structuring of the services according to the strategy 1.0 already described earlier when describing the implementation of the invariant 1. This strategy 1.0 requires the agent $C_{inv}$ to send a message requesting services structuring to the service structuring agent $COTS_S$. Pursuant to its rules, the structuring agent establishes that, for implementing the overall aim in accordance with the given conditions, the agent $C_{inv}$ is able to have available "cycle-investment" and "merger-acquisition" services. The agent $C_{inv}$ then creates the two services $P_{cycle\ inv}$ and $P_{mer-acq}$. The data structuring agent $COTS_D$ also sends appropriate structured data, namely the data packets $DM_{cycle\ inv}$ and $DM_{mer-acq}$. The agent $C_{inv}$ is now able to implement its strategy 2.2 for validating the knowledge objects $O_1^{\delta 1+\delta 2+\delta 3}$ and $O_3^{\delta 1+\delta 2+\delta 3}$.

According to the strategy rule for validating the object $O_1$ in its completed version $O_1^{\delta 1+\delta 2+\delta 3}$ in accordance with the conditions defined by
   if form $O_1$ extracted from the structured data $DM_{RA}$,
   if property of $O_1$=numerical value deviation in management report
the agent $C_{inv}$ sends a message of aim 1=strat 2.2=validation per track on the object $O_1$ to the track agent $P_{cycle\ inv}$.

Pursuant to its strategy rules for validating the object $O_3$ in its enriched version $O_3^{\delta 1+\delta 2+\delta 3}$, by implementing the strategy 2.2 in accordance with the conditions defined by
   if form of $O_3$ is extracted from the data $DM_{Asia}$,
   if property of $O_3$=design branch density,
the agent $C_{inv}$ sends the message of
   aim=strat 2.2=validation per track
on the object $O_3$ to the track agent $P_{mer-acq}$.

It shall be observed that because the object $O_1$ has been extracted from the accounting field and is an alarm on the numerical values of the management report, in fast strategy it is validated on the investment cycles. On the other hand, the object $O_3$, which has been extracted from the economic-political field and is an alarm on a density of points in the knowledge tree, in fast strategy it is validated in the "merger-acquisition" field.

According to the aim and strategy rules, already described in the description in executing the invariant 1, the track agents need to select the number of analyser agents.

Pursuant to these aim rules=local aim=validation per track on the object $O_1$ requesting the implementation of the strategy 1=support point search, the track agent $P_{inv}$ creates an analyser agent, namely the agent $A_{cycle\ inv}$ and sends the aim message=strat 1=support point search to this agent.

The track agent $P_{mer-acq}$, according to its aim rule "if aim=local aim 1=validation per track on $O_3$, pursuant to the strategy strat=strat 1 which ensues from this creates an analyser agent, namely the agent $A_{mer-acq}$ and sends the message aim 1=strat 1=support point search on $O_3$ to the agent $A_{mer-acq}$.

As this has also been explained earlier at the time of describing the execution of the invariant 1, the analyser agents implement aim and action plan rules to carry out the validation operations.

There now follows a detailed explanation of the work of the analyser agents according to their aim and action plan rules.

The analyser agent $A_{cycle\ inv}$ implements the plan and aim rules according to the fact that the sign $O_1$ is from the category 1 and that the alarm is triggered on a numerical value deviation property in the management report. For the implementation of the plan, the agent $A_{cycle\ inv}$ creates 3 cognitif agents, i.e. LOC=detector of design branch; FOC=detector of signals TB; VAL=detector of correlation.

The analyzing agent $A_{cycle\ inv}$ shall first send a request to the context precision agent LOC. The agent LOC implements the following aim rule:

If aim=state context of $O_1^{\delta 1+\delta 2+\delta 3}$ (plan 1, overall aim, $DM_{cycle-inv}$, $DM_{RA}$),
  if form $O_1$ extracted from $DM_{RA}$ if form type=skeleton, if context
  $O_1$=product A, if $O_1$ linked to $O_7$ of type=context of
⇒use know-how 1=detect design branch contour on criterion describing the context of the object $O_1$ in $DM_{cycle\ inv}$
⇒create $O_{20}$ (design branch)
  →ID
  →Type (mark point)
  →Creator LOC ($A_{cycle\ inv}$)
  →Form (type=zone, creator LOC, structure $DM_{cycle\ inv}$, index, form=design branch, media=design tree)
  →Connect to ($O_1$: creator LOC, type=linked by the context ($O_1$), $O_7$:
    creator LOC, type=describing context)
⇒update $O_1^{\delta 1+\delta 2+\delta 3}$
  Connected to ($O_{20}$: creator LOC, type—connected by the context ($O_1$))
⇒make request for establishing small signals on $O_{20}$ in $DM_{cycle-inv}$ to FOC
⇒if return from FOC=($\delta^1 O_{20}$, $O_2$), update $O_{20}$ in LOC: $\delta^1 O_{20}$
⇒return to father agent ($\delta^4 O_1^{\delta 1+\delta 2+\delta 3}$, $O_{20}^{\delta 1}$, $O_2$
  →Connected to ($O_2$: creator FOC, type=contains)

From the plan rules, the agent $A_{cycle-inv}$ creates three cognitive agents, namely a localisation agent LOC formed by a design branches contour detector, a focussing agent FOC formed by an management report signals detector (TB) and a validation agent VAL formed by a correlation detector. The analyser agent $A_{cycle\ inv}$ sends a context precision request concerning the object $O_1^{\delta 1+\delta 2+\delta 3}$ to the agent LOC in an investment cycle knowledge field $DM_{cycle\ inve}$, whereas the sign has been created in an accounting knowledge field $DM_{acc}$. This implements the multi-point-of-view analysis inside a machine IKM. The agent LOC must detect a contour in the structured knowledge design tree $DM_{cycle-inv}$, on criterion connected to the context of the sign. This criterion concerns the product PA. The cognitive agent shall illuminate the points concerning the product PA in the design tree diagrammatically shown on FIG. 2. The design tree corresponding to the structured knowledge tree $DM_{CR}$ according to FIG. 2 has for its branches the turnover ca, the charges ch, the results res. But in the tree $DM_{cycle-inv}$ the branches constitute the Research-Development stations (R & D), Commercial COC and Production FA. On FIG. 2, the agent LOC shall illuminate the points on the products sub-branches P the points representing the product PA. The contour surrounding the product PA in the design tree $DM_{cycle-inv}$ constitutes the knowledge object created by the agent LOC. This object is of the mark point type, has the form type=zone, form=design branch, media=design tree and is connected to $O_1$ by the context $O_7$. This creates a new knowledge element $\delta^4 O_1$ and the agent LOC updates the object $O_1^{\delta 1+\delta 2+\delta 3}$ which then becomes $O_1^{\delta 1+\delta 2+\delta 3+\delta 4}$.

Then the agent LOC sends a request to the agent FOC so that the latter can establish small signals concerning the object $O_{20}$ in the structure $DM_{cycle\ inv}$. The agent FOC implements the know-how rules as defined hereafter:

If aim=establish small signals on $O_{20}$, if structure= $DM_{cycle\ inv}$, if form type ($O_{20}$=design tree)
⇒use know-how 1=calculation of management report signals (TB) in structure $DM_{cycle-inv}$
⇒if signals amplitude>threshold 1, if source values signals surface>threshold 2, create $O_2$ so that:
  →ID
  →Type (sign)
  →Creator FOC ($A_{cycle\ inv}$)
  →Form (type=skeleton, creator FOC), structure $DM_{cycle-inv}$, sign, form=numerical value, media= numerical value in $DM_{cycle-inv}$
  →Property (Deviation TB)
  →Connected to ($O_{20}$: creator FOC, type=contained in
⇒update $O_{20}$:
  $\delta^1 O_{20}$
  →Connected to ($O_2$: creator FOC, type contains)
⇒return to LOC ($\delta^1 O_{20}$, $O_2$)

Pursuant to these rules, the agent FOC establishes management report small signals in the structure $DM_{cycle-inv}$. If the agent FOC detects signals with an amplitude exceeding the threshold 1, it creates the object $O_2$ indicated earlier which is of the sign type, a form of the skeleton type and represents a numerical value by being connected to the object $O_{20}$ by a link of the "contained in" type. By referring to FIG. 2, it can be seen that the object $O_2$ is located inside the contour $O_{20}$ on the products sub-branch P of the branch R & D. This brings a knowledge element $\delta^1 O_{20}$ to the object $O_{20}$ and enables the agent FOC to update the object $O_{20}$ so that the latter becomes $O_{20}^{\delta 1}$. Then the agent FOC sends back to the agent LOC the objects $\delta^1 O_{20}$ and $O_2$. After the return of $\delta^1 O_{20}$ and $O_2$ to the agent LOC, the latter updates the object $O_1$ according to $\delta^4 O_1$ which then becomes $O_1^{\delta 1+\delta 2+\delta 3+\delta 4}$. Then the rules of the agent LOC make the latter send the elements $\delta^4 O_1^{\delta 1+\delta 2+\delta 3+}$, $\delta^1 O_{20}$ and $O_2$ to the agent $A_{cycle\ inv}$. This agent then asks the validation cognitive agent VAL to specify the objects $O_1^{\delta 1+\delta 2+\delta 3+\delta 4}$, $O_{20}^{\delta 1}$, $O_2$ according to the following validation know-how rules:

If aim=specify $(O_1^{\delta 1+\delta 2+\delta 3+\delta 4}, O_{20}^{\delta 1}, O_2)$, (plan 1 in $DM_{cycle\ inv}$, $DM_{RA}$)

if type $O_2$=sign, if property $O_2$=deviation TB, if $O_2$ linked to $O_{20}$ and of type=contained in, if $O_1$ and $O_{20}$ linked by the context ⇒use know-how 1=search for correlation between $O_1$, $O_2$, $O_{20}$ by common characteristic ⇒if result of know-how 1=$\delta^5 O_1$, update $\delta^5 O_1$
  →Connected to $O_2$ (creator VAL, type=correlation by the context of $O_1$)
  $\delta^1 O_2$
  →Type=(sign: support point)
  →Connected to $O_1$ (creator VAL, type correlation by the context of $O_1$)

⇒return to father $(\delta^5 O_1, \delta^1 O_2, O_{20}^{\delta 1})$

According to its sign precision rule of category 1, the agent VAL, by using its correlation search know-how, shall establish that the objects $O_1$ and $O_2$ are linked because they both concern the product PA. The two objects are therefore correlated by the context PA, which constitutes the new knowledge element $\delta^5 O_1$ connected to $O_2$ and of the correlation type indicated earlier, as well as the new element $\delta^1 O_2$ of the support point/sign type connected to $O_1$. After being updated, the knowledge objects $O_1^{\delta 1\ to\ \delta 5}$, $O_2^{\delta 1}$ and $O_{20}^{\delta 1}$ are sent to the analyser agent $A_{cycle-inv}$ which terminates validation of the knowledge object $O_1$. The validation has made it possible to establish the object $O_2$ constituting a deviation in the R & D field of the $DM_{cycle-inv}$ as a support point of the alarm sign object $O_1$.

During the validation with support search carried out on the object $O_1$, the analyser agent $A_{mer-acq}$ caries out validation of the object $O_3$.

So as to carry out this function, the agent $A_{mer-acq}$ acts according to the following plan and aim rules:

Aim rule
  If aim=local aim 1=search point of support $(O_3,$ overall aim Cat 2) in $DM_{fus-acq}$, $DM_{Asia}$
  ⇒plan=plan 1 $(O_3,$ overall aim, cat 2, $DM_{fus-acq}$, $DM_{Asia})$ Plan rule
  If plan=plan 1 $(O_3,$ overall aim cat 2, $DM_{fus-acq}$, $DM_{Asia})$
  ⇒create two cognitive agents: LOC=design branch detector and VAL=correlation detector
  ⇒send request 1 to LOC=state context of $O_3$ (plan 1, $DM_{fus-acq}$, $DM_{Asia})$
  ⇒if return of request $(\delta^4 O_3, O_{31})$, send request to VAL $(O_3, O_{31})$
  ⇒if end of request=2=$(\delta^5 O_3, O^{\delta 1}_{33}, \delta^1 O_{31})$, return to $A_{Asia}$ $(\delta^5 O_3, \delta^1 O_{31}, O^{\delta 1}_{33})$ More specifically, the agent $A_{fus-acq}$ creates two cognitive agents, namely a localisation agent LOC formed by a design branch contour detector on criterion, and a validation agent VAL which is a correlation detector. By implementing its plan rule, the agent AAw sends a request to the agent LOC asking it to specify the context of the object $O_3$ in the structured knowledge field $DM_{fus-acq}$.

The agent LOC, in response to this request, implements its following context precision rule:

if aim specify context of $O_3^{\delta 1+\delta 2+\delta 3}$, (plan 1, overall aim, $DM_{fus-acq}$, $DM_{Asia}$), if context $O_3$=company with shares falling, if form $O_3$ extracted from $DM_{Asia}$, if $O_3$ linked to $O_{30}$ of type=context of ⇒use know-how 1=detect design branch contour on criterion describing the context of the object $O_3$ in $DM_{fus-acq}$ ⇒create $O_{31}$ (design branch)
  →ID
  →Type (mark point)
  →Creator LOC $(A_{fus-acq})$ structure $DM_{fus-acq}$, form design branch, media=design tree)
  →Connected to $O_3$ (creator LOC, type linked by the context of $O_3$, $O_{30}$: creator LOC, type=describing context)

⇒update $O_3^{\delta 1+\delta 2+\delta 3}$
  $\delta^4 O_3$
  →Connected to $O_{31}$ (creator LOC, type=linked by the context of $O_3$)

⇒return to father agent $(\delta^4 O_3^{\delta 1+\delta 2+\delta 3}, O_{31})$

So as to implement this context precision rule, the agent LOC uses the know-how 1 for detecting the design branch contour as per a criterion describing the context of the object $O_3$ in the field $DM_{fus-acq}$ and organised in the form of a design tree of the field $DM_{fus-acq}$. The object in question is an "acquisition of companies with falling shares" zone. This zone gives rise to the creation of the object $O_{31}$ which is of the mark point type and form of the zone type in the design tree. The object $O_{31}$ is secondly connected to $O_3$ by the context of $O_3$ and to $O_{30}$ which describes the context of $O_3$ in the field $DM_{Asia}$. The link between $O_3$, and $O_{30}$ is virtual in the agent LOC. Then the latter updates $O_3^{\delta 1+\delta 2+\delta 3}$ which makes it possible to obtain $\delta^4 O_3$ which is connected to $O_3$ by a link of the type linked by context of $O_3$. Then the agent LOC sends $\delta^4 O_3^{\delta 1+\delta 2+\delta 3}$ and $O_{31}$ to the father agent, namely the agent $A_{fus-acq}$.

The plan rule of the agent $A_{mer-acq}$ brings the latter after the return of the request sent to the agent LOC to send a request 2 to the agent VAL for the latter the look for a correlation between the objects $O_{31}$ and $O_3$ provided this must involve rival companies concerning the same type of product. This therefore concerns a selection of a contour under a particular criterion. The constraint of rival companies, as commanded by VAL, comes from the fact the sign $O_3$ has been detected by political economy watching agents. It is therefore necessary to study the elements of this sign which are connected with the rivals. The contour that is obtained brings the agent VAL to create the object $O_{33}$ of the support point type. $O_{33}$ is contained in $O_3$ and in $O_{31}$. The agent VAL thus creates the following updatings:

$\delta^5 O_3$
  →Connected to $O_{33}$ (creator VAL, type=contains)
$\delta^1 O_{31}$
  →Connected to $O_{33}$ (creator VAL, type=contains)

The agent still looks to see if there is a common characteristic between the companies of the zone $O_{33}$. In the present example, it proves that these companies have in common their mode of acquisition which is of the type OPA, namely "public purchase offer". This brings as an additional element $\delta^1 O_{33}$ which becomes of the recognised object type, of rival use OPA and has the property of being strategic. The agent VAL then sends the analyser agent $A_{mer-acq}$ the objects $\delta^5 O_3^{\delta 1+\delta 2+\delta 3+\delta 4}$, $\delta^1 O_{31}$ and $O_{33}^{\delta 1}$. The agent $A_{mer-acq}$ updates the elements and sends the track agent $P_{fus-acq}$ the objects $O_1^{\delta 1 \ to \ \delta 5}$, $O_{31}^{\delta 1}$ and $O_{33}^{\delta 1}$. These objects are then sent to the channel agent $C_{inv}$ which transmits all of them with the objects $O_1^{\delta 1 \ to \ \delta 5}$, $O_{20}^{\delta 1}$ and $O_2^{\delta 1}$ originating from the track agent $P_{cycleinv}$ to the agent $UM_{fin}$ which in turn transmits them to the master agent GM. FIG. 4 illustrates for the invariant 2 the creation, construction and movement of the knowledge objects and the objects stored in the various storage devices DST of the various agents constituting the network of the invention.

The agent GM thus has available the results of the two invariant procedures 1 and 2 which have been automatically established by a network of agents each functioning according to the specific action plan, strategy and aim rules in accordance with an overall aim to be reached and able to be modified by a man. In the present case, the object $O_2$ is correlated with the sign $O_1$. These are the two objects which have the property of having deviations in the investment and accounting management reports in relation to the product PA. These two observations give thus a visibility to the financial user on the type of financial problems that are systematically generated by the product A. Secondly, the knowledge object $O_{33}$ proves to be a strategic element enabling the agent GM to evaluate the incident formed by the object $O_3$ which has triggered the validation process which has just been described. This strategic characteristic could be reused subsequently by the system or by the user. Depending on this evaluation, the collective knowledge manager CKM can take appropriate decisions, in particular those to use his Marketing and Technical agents for a further study of the analysis of the problematics concerning $O_1$ and $O_2$, as well as the aim, strategy and plan rules. It is to be noted that the system of the invention ensures a control which may be permanent and be triggered upon the appearance of a small sign by placing in correlation several points of different views, or several competencies.

It should be noted that the machine has, during all the process, results that are obtained in the form of constructed knowledge objects. Since it is able to read the structure of these knowledge objects and, therefore, to know their meaning through interpretation rules that it has, it can give to a man some intervening and deciding proposals enabling him, in case, to intervene on the continuation of the decisional process, and to act accordingly.

The invention has just been described by means of a practical example involving two points of view obtained in different knowledge fields. Of course, other overall aims could involve the taking of a larger number of different points of view or competency fields and, naturally, the self-structuring of another agent network functioning according to other strategy, aim and action plan rules with the creation of service loops matched with an appropriate structured knowledge field provided by the data and service structuring agents.

The preceding description reveals that the structure of the network is composed of agents provided with rules and organised into loops in fractal fashion. The knowledge objects move inside the network under impulses of the rules of the agents. This knowledge is moving knowledge moving "horizontally" and "vertically", that is respectively between the sons of a given loop and the sons and their master.

It is clear from the preceding description that a IKM is a network of agents at the services of a human user, and that a CKM is a network of IKMs at the service of a collection of users, and that the IKMs are connected for example via an Intranet or Internet network. The movable objects move therefore in the Internet or Intranet network.

Any GM can interact with another GM represented on FIG. 1 as GM', thus constituting a network of CKMs via the intranet or Internet networks. The network of CKMs shall be at the service of an organization of multiple groups.

It should be reminded that the decisional process is broken down into decisional stages known as "cognitive invariants" which shall each act and in parallel on the knowledge objects created and that the creator cognitive agents depend on the cognitive invariant and the constructor agents of the overall aim.

The breaking down into strategies and individual aims propagating inside the network shall be repeated for each of the decisional stages each time according to the strategies specific to the decisional stage.

It should still be reminded that all the rules, the aims and the strategies can be modified by a man in order to make the decisional process flexible and adaptable to the users.

The network of agents in the form of a pyramid is also broken down according to vertical parting lines which separate the UM agents from one another. Under each UM is a network of agents which shall be the services available to the function of each agent UM. This is an individual network called IKM implementing the interaction of the various UM services, that is various points of view by a same functional competency corresponding to that of the user. The loop whose agent GM is the master puts the agents UM to interact and shall constitute a network of networks via Internet thus creating a collective intelligence. This network of networks is called the collective network CKM. It is at the service of a collection of users keeping a plurality of functional competencies into interaction.

The system may work according to two modes; the mode IKM and the mode CKM. Any system IKM can potentially be integrated to a CKM. For this, it has always an agent GM which is the father of the agent UM. It is the master agent that permits an integration of the IKM to a CKM.

Finally, it is further to be stressed that in the service structuring agent, for each overall aim the system needs to be able to deal with the services each master agent need to have available for carrying out its task with matched aim and strategy rules. Depending on the availability of the services, the agent is able to put forward several possibilities.

Appendix    Specific aim and strategy rules of invariant 1 of the GM, UM, CM on initialisation

GM

Aim Rule

[if aim = Budget follow up & Restruct (d°1, Cond 1, Profile CKM, State, Structure K), if Cond 1 = (Quick, low Cost), if Profile = Standard, if State = Init, if Structure K = DW,
→ Strat= Strat 1 (Overall Aim, Cond 1, Profile, State, DW) = strat 1.0 + strat 1.1 + strat 1.2]

Strat rule 1.0 (Service structuring)
[If Strat = Strat 1.0 (Overall Aim, Cond 1, Profile, State, GM), if Overall Aim = Budget follow up & Restruct, if Cond 1 = (Quick, low cost), if Profile = Standard, if State = Init,
→Send Aim 1 = Strat 1.0 (Overall Aim, Cond 1, Profile, GM) to COTS Services CKM
→ If Return COTS Services = Services 1, Services 1 = ($U_{Fin}$, $U_{Mark}$, $U_{Tech}$) create master user agents (UM) = Services 1 and end Strat1.0 (Services 1)]

Strat Rule 1.1 (Data Structuring)
[If Strat = Strat 1.1 (Overall Aim, Cond 1, Profile CKM, State, Services 1, Structure K), if Overall Aim = Budget follow up & Restruct, if Cond 1 = (Quick, low Cost), if Profile = Standard, if State = Init, if Services 1 = ($U_{Fin}$, $U_{Mark}$, $U_{Tech}$), if Structure K = DW
→ Send Aim 1 = Strat 1.1 (Overall Aim, Cond 1, services 1, DW) to COTS Data CKM
→ If return COTS Data = Data 1, Data 1 = ($DM_{Fin}$, $DM_{Mark}$, $DM_{Tech}$) extract from DW and terminate Strat 1.1 (Data 1)]

Strat Rule 1.2 (Invariant 1)
[If Strat = Stat 1.2 (Overall Aim, Cond 1, Profile, state, Structure K(n)), if Overall Aim = Budget Follow up & Restruct, if Cond 1 = (Quick, low Cost),
if Profile = Standard, if State = Init, if Structure K(n-1) = ($DM_{Fin}$, $DM_{Mark}$, $DM_{Tech}$),
→Send Aim = Strat 1.2 = Signs detection (Overall Aim, Condition 1, State, $DM_{Fin}$) to $U_{Fin}$ ]

Specific aim and strategy rules of invariant 1 of the GM, UM, CM on initialisation $U_{Fin}$

Aim Rule
[If Aim = sign detection (Overall Aim, Cond 1, Profile IKM$_{Fin}$ State, DM$_{Fin}$), if Overall Aim = Budget Follow up & Restruct, if Cond1 = (Quick, low Cost), if Profile = Standard, if State = Init,
→ Strat 1 = Strat 1 (Overall Aim, Cond 1, Profile IKM$_{Fin}$, State, DM$_{Fin}$)]

Stat 1.0 Rule
[If Strat = Strat 1.0 (Overall Aim, Cond 1, Profile, State, U$_{Fin}$), if Overall Aim = Budget Follow up & Restruct, if Cond 1 = (Quick, low Cost), if Profile, =) Standard, if State = Init,
→ Send Aim 1 = Strat 1.0 (Overall Aim, Cond 1, Profile, State) to COTS Services IKM$_{Fin}$
→ If return COTS services = Services 1, Services 1 = $C_{Compta}$, $C_{Invest}$, $C_{eco-Pol}$), create Channel Agents = Services 1 and terminate Strat 1.0 (Services 1)]

Strat 1.1 rule
[If strat = Strat 1.1 (Overall Aim, Cond 1, Profile, State, Services 1, Structure K(n)), if Overall Aim = Budget Follow up & Restruct, if Cond 1 = (Quick, low Cost), if Profile = Standard, if State = Init, if Services 1 = $C_{account}$, $C_{invest}$, $C_{eco-Pol}$), if Structure K(n) = DM$_{Fin}$
→ Send Aim 1 = Strat 1.1 (Overall Aim, Cond 1, Profile, state, Services 1, DM$_{Fin}$) to COTS Data IKM$_{Fin}$
→ If return COTS Data = Data 1, Data 1 = ((DM$_{account}$, DM$_{Invest}$) extracted from DM$_{Fin}$ and DM $_{eco-Pol}$ extracted from DW), carry out structure K(n-1) = Data 1 and terminate Strat 1.1 (Data 1)]

Strat 1.2 Rule
[If strat = Strat 1.2 (Overall Aim, Cond 1, Profile, State, Structure K), if Overall Aim = Budget Follow up & Restruct, if Cond 1 = (Quick, low Cost), if Structure K = (DM$_{Account}$, DM$_{Invest}$, DM$_{eco-Pol}$):

Specific aim and strategy rules of invariant 1 of the GM, UM, CM on initialisation

→ Send Aim = Strat 1.2 = Index detection per channel (Overall Aim, Cond1, Profile, State, $DM_{Account}$) to $C_{Account}$ → Send Aim = Strat1.2 = index detection per channel (Overall Aim, Cond 1, Profile, State, $DM_{Eco-pol}$) to $C_{eco-Pol}$ $CM_i$ for i = Accounting and i = Eco-Pol <u>Aim Rule</u> -
[ if Aim = index detection per channel (Overall Aim, Cond1, Profile, State, $DM_i$), if Overall Aim = Budget Follow up & Restruct, if Cond 1 = (Quick, low Cost), → Strat = Strat 1 (Overall Aim, Cond 1, Profile, $Dm_i$)]

<u>Strat 1.0 Rule</u>
[if Strat = Strat 1.0 (Overall Aim, Cond 1, Profile, State) applied to $CM_i$ if Overall Aim & Restruct, if Cond 1 = (Quick, low Cost), if Profile = standard, if State = Init, →Send Aim 1 = Strat 1.0 (Overall Aim, Cond 1, Profile, State) to COTS Services $IKM_{Fin}$ → If $CM_i$ = $CM_{Accounting}$ and if return COTS services = Services 1, services 1 = ($P_{States\ Fin}$, $P_{Cycle\ Inv}$, $P_{Cycle\ Fin}$), create the Track Agents = Services 1 and terminate Strat 1.0 (Services 1)

→ If $CM_i$ = $CM_{Eco\ Pol}$, and if return COTS Services = Services 1 = $P_{Inq1}$, $P_{Axis}$), create the Track Agents = Services 1 and terminate Strat 1.0 (Services 1)]

<u>Strat 1.1 Rule</u>
[If Strat = Strat 1. 1 (Overall Aim, Cond 1, Profile, State, Services 1, Structure K(n) applied to $CM_{Accounting}$, if Overall Aim = Budget Follow up & Restruct, if Cond 1 = (Quick, low Cost), if Services 1 = ($P_{States\ Fin}$, $P_{Cycle\ Inv}$, $P_{Cycle\ Fin}$), if Structure K(n) = $DM_{Accounting}$, → Send Aim 1 = Strat 1.1 (Overall Aim, Cond 1, Services 1, $DM_{Accounting}$) to COTS Data $IKM_{Fin}$ → If return COTS Data = Data 1, Data 1 = ($DM_{States\ Fin}$, $DM_{Cycle\ Inv}$, $DM_{States\ Fin}$) extracted from $DM_{Accounting}$, carry out structure K (n-1) = Data 1 and terminate Strat 1.1 (Data 1)]

[If Strat = Strat 1.1 (Overall Aim, Cond1, Profile, State, Services 1, Structure K(n)) applied to $CM_{Eco-Pol}$, if overall Aim = Budget follow up & Restruct, if Cond 1 = (Quick, low Cost), if Services 1 = ($P_{Ireq}$, $P_{Asse}$), if Structure K(n) = $DM_{Eco-Pol}$,
→Send Aim 1 = Strat 1.1 (Overall Aim, Cond 1, Services 1, $DM_{Eco-Pol}$) to COTS Data $IKM_{Fin}$
→If return COTS Data = Data 1, Data 1 = ($DM_{Ireq}$, $DM_{Asse}$) extracted from $DM_{Eco-Pol}$, carry out structure K(n-1) = Data 1, and terminate Strat1.1 (Data 1)]

Strat 1.2 Rule
[If Strat = Strat 1.2 (Overall Aim, Cond 1, Profile, State, Structure K) applied to $CM_{Accounting}$, if Overall Aim = Budget Follow up & Restruct, if Cond 1 = (Quick, low Cost), if Structure K = ($DM_{Stares Fin}$, $DM_{Cycle Inv}$, $DM_{Cycle Fin}$),

FIG. 33

Specific aim and strategy rules of invariant 1 of the GM, UM, CM on initialisation → Send Aim = Strat 1.2 = Sign detection per track (Overall Aim, Profile, State, $DM_{States\ Fin}$) to $P_{States\ Fin}$]

[If strat = Strat 1.2 (Overall Aim, Cond 1, Profile, State, Structure K) applied to $CM_{Eco-Pol}$, if Overall Aim = Budget Follow up & Restruct, if Cond 1 = (Quick, low Cost), if Structure K = ($DM_{Ind}$, $DM_{Asia}$), _ Send Aim = Strat 1.2 = Sign detection per track (Overall Aim, Cond 1, Profile, State, $DM_{Asia}$) to $P_{Asia}$]

APPENDIX II

Generic rules concerning Aims and Structuring Strategies and of Invariant 2 of GM, UM, C Generic Aim Rule 1 of GM

[If Aim = Overall Aim (d°1, Cond1, Profile CKM, Structure K, State) and if return of signs detection = $O_i$ of $UM_i$, if call return Op1 ($O_i$) = yes
(validation), if call return Op2 = ($O_i$) = yes
⇒ Strat = Strat.2 and Strat.2 ($O_i$, Overall Aim, Cond1, Profile, State, Structure K) and if d°Aim = 1, Carry out d°Aim = 2]

Generic Aim Rule 2 of GM

[If Aim = Overall Aim (d°1, Cond1, Profile CKM, Structure K, State) and if return of Sign Detection = $O_i$ of $UM_i$, if call return Op1 ($O_i$) = yes), if return call OP2 = ($O_i$) = no
⇒ Strat = Strat 1.2 and Strat2 ($O_i$)]

Generic Strategy Rule of GM (Validatio) Strat 2

(If Strat = strat 2) ($O_i$) (Overall Aim, Cond1, Profile, State, Structure k (n)), if Services)
Associate with Agent n = Services 1,
⇒ Search for Structure k(n-1) associated with Structure k(n) and Services 1

Generic rules concerning Aims and Structuring Strategies and of Invariant 2 of GM, UM, C

⇒ Send Aim 1 = Strat3 (O, Overall Aim, Cond1, Profile CKM, State, Structure k(n-&) to $UM_t$ according to Cond1]

5  Generic Aim Rule of UM, C (Validation)
[If Aim = Local Aim 2 (O, Overall aim, Cond1, Profile CKM or IKM, State, Structure K)
⇒ Strat 2 (O, Overall Aim, Cond1, Profile CKM or IKM, State, Structure K)]
Comment : The Agents UM below transmit the Profile IKM. Only GM and UM receive the Profile CKM.

10 Generic Strategy Rule UM, C (Structuring and Invariant 2) Overall Strategies)
[If Strat = Strat 2 (O,) (Overall Aim, Cond1, Profile, State, Structure k(n)), if State = INIT
⇒ Look to see if any Agents (n.. =) exist, if there are none :
⇒ Make Strat = Strat 1.0 (Overall Aim, Cond1, Profile, Agent) (Structuring Services) *(See Rules concerning Structuring and Invariant 1)*

15 ⇒ If End strat 1.0 = Services 1, carry out Strat = Strat 1.1 (Overall Aim, Cond 1, Profile, Services 1, Structure k(n) (Data Structuring)
⇒ If End strat 1.1 = Services 1, carry out Structure k(n-1) = Data 1 store Structure k(n-1) associated with Structure k(n) and with Services 1, and make Strat 2.2 (O, Overall Aim, Cond1, Profile, State, Structure k(n)) (Invariant 2)

20

Generic Rules concerning Aims and Structuring Strategies and of Invariant 2 GM, Um, C

⇒ If there are any Agents (n-1), make Strat = Strat 2.2 (Invariant2)]

Generic Strategy Rule of UM (Strat 2.2)

[If Strat = Strat 2.2 (O, Overall Aim, Cond1, Profile IKM, State, Structure K(n-1)) if Agent (n-1) = Services 1
⇒ Look for Structure K (n-1) associated with Structure K (n) and Services 1
⇒ Send Aim = Strat 2.2 = Validation-Channel (O, Overall Aim, Cond1, Profile, State, Structure K (n-1) to CM, according to Cond1]

Generic Strategy Rule of C (Strat 2.2)

[If strat = Strat 2.2 (O, Overall Aim, Cond1, Profile IKM, State, Structure k(n)), if Agent (n-1) = Services 1, if Form (O,) extracted from Structure K',
⇒ Look for Structure K' in Structured Data Server
⇒ Look for Structure K(n-1) associated with Structure K(n) and Services 1
⇒ If Search Response = Structure K(n-1) and K', send Aim = Strat 2.2 = Validation- Track (O, Overall Aim, Cond1, Profile, State, Structure K(n-1), K') to PM, according to Cond1 and Property (O,)]

Generic Rules concerning Aims and Structuring Strategies and of Invariant 2 of GM, UM, C

Comment : The validation strategy of the Master Channel depends on the operational conditions (cond1) and certain fields of O, particularly the origin of the its form (which gives the field to which the sign belongs) and the Property field (which gives the type of knowledge concerning the sign)

What is claimed is:

1. A method for controlling a decisional process in an expert system when pursuing an overall aim in a specific field of application, the method including:

establishing, in accordance with an overall aim, a network having multiple levels of data processing agents, said data processing agents being structured in a hierarchy; and organizing said agents in said network into loops, with an agent of one level constituting a master agent and at least one child agent in a level directly below said master agent and associated with the master agent so that a strategy followed by said master agent is an aim of said child agent, wherein said agents at a lowermost level of the hierarchy are knowledge object creating agents and said agents located in the levels above said object creating agents are knowledge object constructing agents, providing additional knowledge elements to knowledge objects created by said knowledge object creating agents by placing a knowledge object issued from knowledge objects created in relation with other knowledge objects, reflecting other points of view or other functional competencies in the specific field of application or in other fields, each knowledge object being propagated from the lowermost level of the hierarchy to an uppermost level of the hierarchy and being completed by addition of the additional knowledge elements.

2. The method according to claim 1, wherein said knowledge object creating agent observes data produced in a field of application with which said knowledge creating agent is associated to create the knowledge object when said knowledge object creating agent detects data which may be interpreted as an alarm signal, the knowledge objects propagate toward the uppermost level of the hierarchy, through knowledge object constructing agents located in the hierarchy between said object creating agents and the uppermost level of the hierarchy, and said knowledge object constructing agents place knowledge objects received in relation with one another and add to a knowledge object received additional knowledge elements obtained by placing the knowledge objects received into relation with one another.

3. The method according to claims 2, wherein said network of agents manipulates the knowledge objects which become movable knowledge moving inside said network.

4. The method according to claim 2, wherein said network has a hierarchical structure dependent on the overall aim, each of said agents comprising aim and strategy rules and, if appropriate, action plan rules.

5. The method according to claim 4, wherein each child agent can be a master agent of a loop for a lower level of said network, end loops of said network being formed by analysis loops of knowledge objects comprising a knowledge objects analyser master agent and one of said knowledge object creator agents, the knowledge objects being constructed when moving within said network towards the uppermost level of said network.

6. The method according to claim 5, wherein the movable knowledge objects move within said network inside the loops or between the loops.

7. The method according to claim 5, including successively breaking up the decisional process from the overall aim into individual strategies and aims, the strategy of one of said agents at a level n of said network becoming the aim of said agents of a next lower level, n-1, of said network.

8. The method according to claim 6, including breaking up the decisional process into decisional steps defined as cognitive invariants which are propagated as aims and strategies from level to level in said network.

9. The method according to claim 7, wherein said network has a fractal configuration.

10. The method according to claim 1, wherein, for a given application comprising the overall aim, determining structures of the loops by referring to an agent for structuring services of the loop and a knowledge structuring agent for each service that is created.

11. The method according to one of claims 1, including a cognitive agent associated with an analyser agent for creating an alarm sign knowledge object representative of an alarm sign, and a cognitive agent for establishing a context knowledge object of a context in which the alarm sign knowledge object is located.

12. The method according to claim 11, wherein the context constitutes another knowledge object and the alarm sign knowledge object is updated by the context knowledge object.

13. The method according to claim 11, wherein the cognitive agent is a detector producing numerical values.

14. The method according to claim 11, wherein the cognitive agent is a zone detector in a knowledge structure having a concept tree.

15. The method according to claim 14, wherein the cognitive agent is a detector of common characteristics between the alarm sign knowledge object and the context knowledge object.

16. The method according to claim 2, including cognitive agents for creating alarm sign objects and using context in which the alarm sign objects are located to implement a first invariant for creating alarm sign knowledge objects, such as a sign detection process, the first variant pertaining to a first structured knowledge field.

17. The method according to claim 16, including implementing at least one second invariant for validating knowledge objects created during the first invariant, in a second structured knowledge field different from the first structured knowledge field of the first invariant.

18. The method according to claim 17, wherein, for implementing the second invariant, a cognitive creator agent is associated with an analyser agent for detecting, from the second structured knowledge field, knowledge objects of the first invariant, context knowledge objects agent associated with the analyser agent creating, if appropriate, a creator agent for detecting signals concerning the context knowledge objects and a validation cognitive agent detecting correlations constituting points of support for the alarm sign knowledge objects created during the first invariant.

19. The method according to claim 1, including a Man-Machine dialogue in order that a man can modify rules of the method based on the man's knowledge.

20. The method according to claim 19, including showing to the man, during the decisional process, results obtained and offering decisional and intervening strategies to the man.

21. A system for implementing the method according to claim 1, including a network having multiple levels of data processing agents having a hierarchical structure wherein a master agent at a level n is associated with child agents at a lower level, n-1, each child agent being a master agent of child agents of a still lower level, n-2, a lowermost level of said network including analyser agents having respective cognitive agents creating knowledge objects.

22. The system according to claim 21, including at least one individual user as an individual knowledge manager.

23. The system according to claim 21, comprising a plurality of said individual knowledge managers including child agents of a master agent, constituting a collective knowledge manager.

24. The system according to claim 23, comprising a plurality of said collective knowledge managers constituting a community knowledge manager.

* * * * *